J. MAHER.
ACCOUNTING MEANS.
APPLICATION FILED OCT. 12, 1912.

1,130,832.

Patented Mar. 9, 1915.

WITNESSES

FIG.2ª.

INVENTOR

UNITED STATES PATENT OFFICE.

JAMES MAHER, OF EAST LIVERPOOL, OHIO.

ACCOUNTING MEANS.

1,130,832.  Specification of Letters Patent.  Patented Mar. 9, 1915.

Application filed October 12, 1912. Serial No. 725,542.

*To all whom it may concern:*

Be it known that I, JAMES MAHER, a resident of East Liverpool, in the county of Columbiana and State of Ohio, have invented certain new and useful Improvements in Accounting Means, of which the following is a specification.

This invention relates to a simple and accurate accounting means which provides for visual accountability records in the hands of both merchant and customer where the accountability is on a credit basis. The present invention enables this accountability to be had without the necessity of the merchant keeping the ordinary books of account as now generally practised which practice involves entering the purchases in a day book or blotter in addition to entering them in the customer's pass book, and then posting the charges in a ledger. In addition thereto itemized statements are frequently rendered the customer. Altogether much more bookkeeping and accounting is required than is warranted by the business of the average retailer. Also, with the old system the total amount a customer owes cannot be ascertained until his ledger account is fully posted, and in the mean time his purchases may exceed the amount of credit extended him.

The practice herein proposed obviates each and all of the objections referred to. No bookkeeping is necessary, and the amounts of successive charges are cumulated in such manner that at the completion of each transaction the merchant knows the exact amount of credit the customer has consumed and the stipulated maximum credit cannot be exceeded in any transaction without the merchant having knowledge of it at that time.

The means for practising the invention are fully described hereinafter, and claimed, and illustrated in the accompanying drawings wherein—

Figure 1:
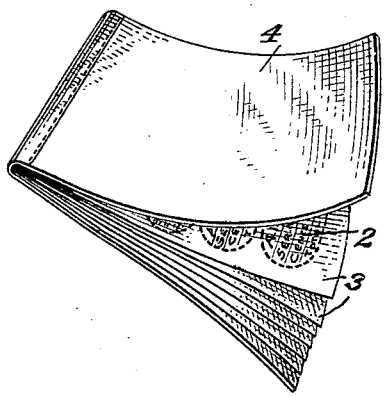
Figure 2:
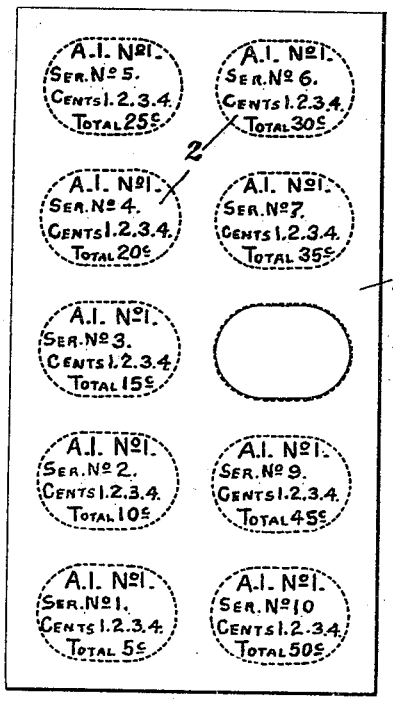
Figure 3:
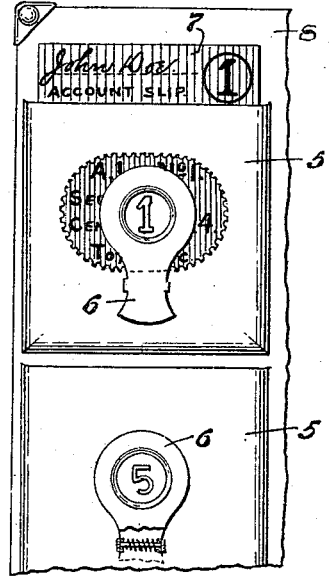
Figure 3:

Figure 1 is a view in perspective of a book of tickets or coupons which the merchant furnishes the customer, and Fig. 2 is a view of one of the pages of the customer's book. Fig. 2ᵃ is a view of one of the tickets or checks removed from the page shown in Fig. 2. Fig. 3 is a view showing a way in which the merchant may provide his accountability record.

In practising the invention the merchant delivers to the customer a series of checks or tickets 2 bearing printed indications, as hereinafter described, whereby the status of the customer's account is shown, an appropriate check being taken by the merchant following each purchase. While the customer's tickets or checks may be assembled or arranged in any desirable or convenient manner, they are here shown as perforated in page 3 of book 4, with all of the pages accessible so that the desired check from any page may be gotten at and conveniently removed by the merchant. As here shown, the printing on the face of each check includes the merchant's number, as $A^1$, and a customer's number, as No. 1. The merchant's number or designation is of course the same on all checks issued by him, and the customer's number remains the same so long as he deals with the merchant. The checks are numbered consecutively or serially as shown in Fig. 2, and each check bears a money indication different in amount from any other check. For retail stores money designations may conveniently begin on check serial No. 1 with five cents, and increase in multiples of five as the serial numbers increase. Also, each check has printed thereon the Figs. 1, 2, 3 and 4 which may be utilized for indicating odd cents. Each of the coupon or ticket books 4 may contain any desired money total of credit checks 2, and the book may be conveniently utilized for limiting the amount of credit available to the customer. Thus, if credit is extended not to exceed $10.00, a book will be issued which contains 200 checks which are numbered serially from 1 to 200, with check No. 1 marked for five cents, and check No. 200 for $10.00.

In practice, if a customer's initial purchases total 40 cents the merchant removes the perforated check or ticket 2 from page 3 on which 40 cents is indicated. Check serial number 8 is thus removed from the book, thereby making void all the checks bearing lower serial numbers. The check indicating the total of the purchase is retained by the merchant, convenient means for holding the same being employed. If at the next transaction the purchase amounts to say 10 cents, the merchant refers to the last previous check taken from that customer's book, and as in the present example he will find previous purchases amounting to 40 cents, he will add thereto the amount of the transaction then in hand, viz., 10 cents, making a total of 50 cents, and he will remove the 50 cent check from the book, bearing serial No. 10, thereby voiding all the checks of lower number and amount as before explained. The merchant will then substitute this 50 cent check for the 40 cent check theretofore held, destroying the latter. If the amounts involve odd cents, they may be indicated by punching the appropriate cent indication on the removed check. As a book of checks is of no value after the check bearing the highest money indication has been removed, a new book will be furnished the customer, provided of course he has settled with the merchant for the book last used or has made satisfactory arrangements for further credit. When a second book is furnished the checks 2 thereof are numbered serially in continuation of the numbers of the first book, and so on with all new books furnished the same customer. Thus, the series numbers are always increasing and making void unused checks of lower numbers, so that it is impossible for the customer to make use of any check that may have remained in an exhausted book.

The checks 2 may be variously utilized in keeping track of the customer's account. Thus, if a customer's credit is limited to $10.00, and he has been furnished a $10.00 book, and after that book is exhausted he is able to pay only $8.00 of the $10.00 then owing the merchant, the merchant can issue to him another $10.00 book and remove from the new book the $2.00 check, thus taking the balance due on the old book out of the new book before any purchases are actually made on the new book, and hence no further memorandum need be kept of the unpaid balance. The customer knows at all times the exact amount owing the merchant, as indicated by the last check removed, and the check delivered by the customer to the merchant is in effect a receipt for the goods purchased. As all the checks bear the customer's number they are not transferable, and hence are of no value to any one excepting that particular customer. If the improved means is used by several merchants in the same locality, or if the same customer is dealing with different merchants using the improved system, confusion cannot result as the merchant's number appearing on each check will at once show to which store the checks belong.

It is desirable that the merchant shall be provided with convenient means for having ready access to the check last taken up from each and every customer, and for this purpose a pocket-like holder 5 may be provided having on its outer face a spring-clip 6 which bears the customer's number. The holder may have a properly-designated clip for each customer. When an account is opened, a slip 7 bearing the customer's name and number may be placed in the pocket, as in Fig. 3. The slip may be utilized for any desired memoranda, for instance, the date when the account was opened, the dates when books or checks were delivered to the customer, etc. Each check taken from a customer is placed beneath its appropriate clip, the last previous check taken from the same customer being thereby voided, and being of no use or value may be destroyed. By this means a ticket or check for each charge customer, showing the exact amount the customer owes will be provided in the individual clips, and bookkeeping and the tedious posting of accounts, always burdensome for retail storekeepers, is entirely dispensed with.

From the above disclosure it will be seen that the tickets or sales checks become of value only when detached, the detaching of a check acting to provide a visible indication of bills payable accountability to the customer (through the absence of the check from its position) and bills receivable accountability to the merchant (through his possession of the check), thus causing the check to serve the purpose of double accounting. This action is brought about through the fact that the amount indication of each check differs from that of the remaining checks so that the break in the normal continuity of the regular progression provides the visible indication of the bills payable amount without affecting the remaining checks, the presence of the latter acting to indicate the particular selection. Additionally, the selection of a check renders preceding checks void, being retained in the hands of the customer but being of no accountability value excepting for the purpose of indicating the selected check. This action is repeated on the successive sale, the visible indications, however, acting to supersede those previously had, rendering such prior indications void excepting for reference purposes, thereby eliminating any liability of increasing accountability through multiplicity of checks, enabling a single check to indicate the total accountability although such accountability may be provided through a number of successive sales, the absence of intermediate checks indicating the sales in the customer's record, a matter of unimportance to the merchant under the invention herein disclosed. In this respect, the fractional indications are of value, the absence of a check indicating bills payable accountability of the total of that check amount indication, but the punched fractional indication indicating that the bills receivable check is of less value and intermediate the amount indications of the punched check and the prior check of the progressive series. By this arrangement, the mutilation of a check by punching acts to decrease accountability, thus protecting the customer, but since the punching is in the hands of the merchant, he in turn is protected.

It will be understood that the invention is not confined to arranging the checks 2 in book form or in perforated outlines in sheets, and it is also obvious that the invention is not restricted to the means here shown for enabling the merchant to hold or retain the checks received from the customers.

I claim:—

1. In a sales check system, a plurality of individually-detachable sales checks having common merchant and customer designations, each check also having an amount indication individual to itself, the several amount indications increasing in a definite progression, the designations of a check providing a merchant bills receivable accountability when detached, and the absence of the check in the regular sequence of checks indicating a customer bills payable accountability.

2. In a sales check system, a plurality of individually-detachable sales checks having common merchant and customer designations, each check also having an amount indication individual to itself, the several amount indications increasing in a definite progression, the designations of a check providing a merchants bills receivable accountability when detached, and the absence of the check in the regular sequence of checks indicating a customer bills payable accountability, the detaching of a succeeding check increasing the accountability by the difference between the amount indications of the two checks.

3. In a sales check system a plurality of individually-detachable sales checks having common merchant and customer designations, each check also having an amount indication individual to itself, the several amount indications increasing in a definite progression, said checks being chargeable as bills receivable only when detached, the chargeable amount being limited to that carried by the detached check of highest amount indication, said latter check providing a visual indication of the totality of bills payable charge against the customer.

4. A sales check system element comprising a plurality of individually-detachable sales checks having common merchant and customer designations, each check also having an amount indication individual to itself, the several amount indications increasing in a definite progression, said checks being relatively positioned to permit removal of a selected check from the element and leave the remaining checks intact, said removed check forming a visible bills receivable indication in the hands of the merchant, and its absence in the check sequence indicating the sales amount chargeable against the customer.

5. A sales check system element comprising a plurality of individually-detachable sales checks having common merchant and customer designations, each check also having an amount indication individual to itself, said checks being serially numbered, the several amount indications increasing in a definite progression in correspondence with numbering, the removal of a selected check providing a bills payable accountability of the amount indicated by check to the customer through the absence of the check from the series and a bills-receivable accountability of similar amount to the merchant through his possession of the check.

6. A sales check system element comprising a plurality of individually-detachable sales checks having common merchant and customer designations, each check also having an amount indication individual to itself, the several amount indications increasing in a definite progression, a removal of a selected check providing a visible bills receivable accountability to the merchant, each check having in addition fractional indications common in all of the checks, said latter indications being selectively punchable to decrease the accountability.

In testimony whereof I affix my signature in presence of two witnesses.

JAMES MAHER.

Witnesses:
Thomas Terry,
George Wurzel.

Copies of this patent may be obtained for five cents each, by addressing the "Commissioner of Patents, Washington, D. C."